United States Patent [19]

Lee

[11] Patent Number: 5,058,239
[45] Date of Patent: * Oct. 22, 1991

[54] FIXING KNUCKLES IN FOLDABLE ALUMINUM LADDER

[75] Inventor: Dickey Lee, Taipei, Taiwan
[73] Assignee: Alfa Metal Corp., Taipei, Taiwan
[ * ] Notice: The portion of the term of this patent subsequent to Oct. 22, 2006 has been disclaimed.
[21] Appl. No.: 851,495
[22] Filed: Apr. 14, 1986
[51] Int. Cl.⁵ .................. E05D 11/10; F16C 11/00
[52] U.S. Cl. ........................ 16/324; 16/332; 403/93
[58] Field of Search .......... 16/323, 324, 325, 326, 16/332, 334; 403/93; 182/163

[56] References Cited

U.S. PATENT DOCUMENTS

| | | | |
|---|---|---|---|
| 3,643,292 | 2/1972 | Mayer | 16/325 |
| 3,879,146 | 4/1975 | Mayer | 16/325 |
| 4,543,006 | 9/1985 | Wang | 16/332 |

Primary Examiner—Richard K. Seidel
Assistant Examiner—Carmine Cuda
Attorney, Agent, or Firm—Browdy and Neimark

[57] ABSTRACT

A modified structure of a fixing knuckle commonly used in an aluminum folding ladder is disclosed. The present disclosure is characterized in its locking assembly including a rectangular locking block and a frame consisting of two parallel L-shaped cam plates connecting together at their top ends, and the locking block having a connecting head integrally joined thereto pivotably mounted on the frame. The fixing knuckle is comprised of an outer casing and an inner disk member, rotatably joined together with the inner disk member housed in the outer casing through a splitting opening thereon, and the frame is astride mounted on the inner disk member with a pulling spring attached to the end thereof for allowing the cam plates to reciprocatingly move about a pivot joining the frame and the locking block. The present disclosure is further characterized in a number of projecting guide pins riveted on both sides of the inner disk member which work in cooperation with the L-shaped cam plates of the frame to effect the change of the fixing angle of the fixing knuckle.

5 Claims, 2 Drawing Sheets

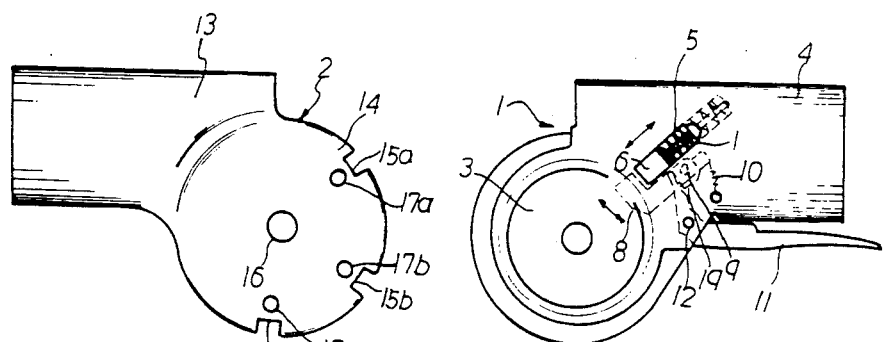
FIG.1
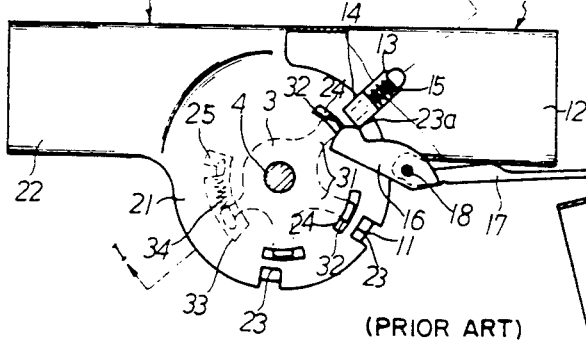
FIG.9A (PRIOR ART)
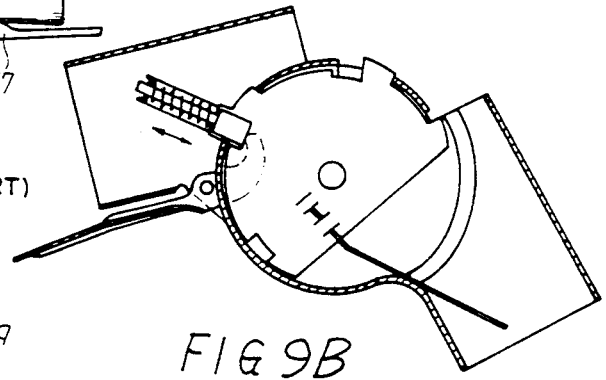
FIG.9B (PRIOR ART)
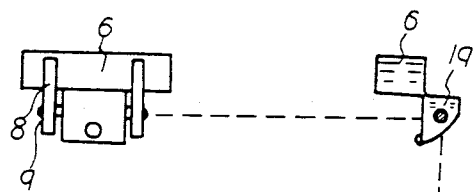
FIG.2
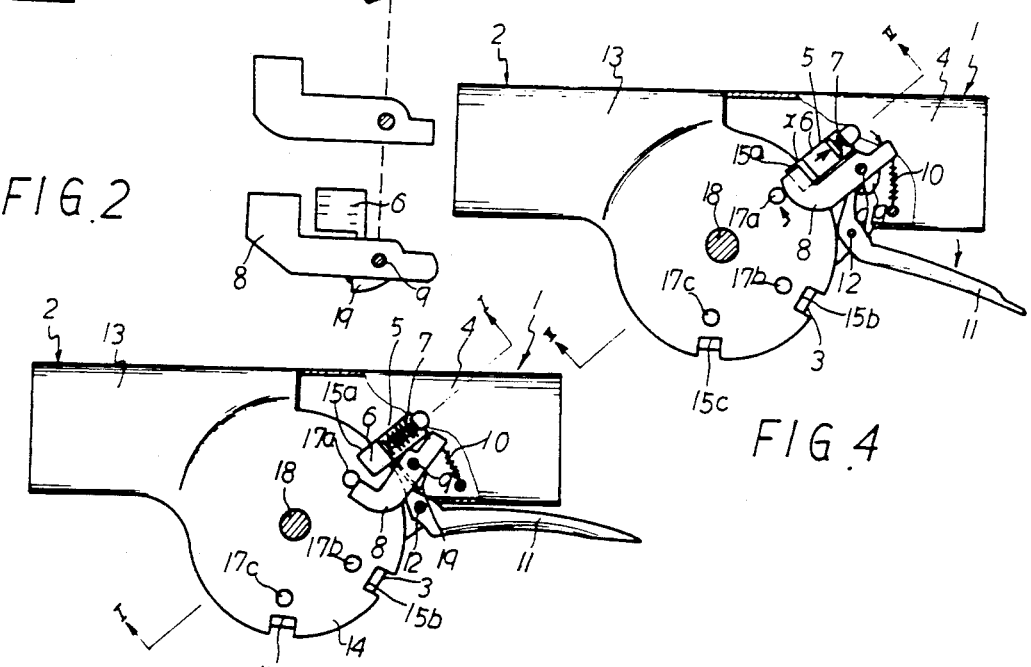
FIG.4
FIG.3

FIXING KNUCKLES IN FOLDABLE ALUMINUM LADDER

SUMMARY OF THE INVENTION

In a conventional aluminum folding ladder, the fixing knuckles are, as a rule, manufactured through a punching process of sheet steel, and composed of an outer casing and a inner disk member; the outer casing, having a wide peripheral spliting opening through which the hollow inner disk member is inserted thereinto, also accomdates therein a locking assembly and an unlocking trigger means which is used to prop up the locking block, and a number of block-receiving dents are disposed along the periphery of the inner disk member which is bolted together with the outer casing in assembly. The adjustment of a conventional fixing knuckle is effected by way of a trigger means disposed outside the outer casing and a locking block which are structured in an approximately similar manner to the present disclosure, and the only difference lies in the inner disk member; there are two types of mechanism used in conventional fixing knuckles: the first type shown in FIG. 9B consists of a fan-shaped peripherally toothed board having a spring attached thereto so that on the trigger means being actuated, the board comes into a position in which the projected teeth are located on top of said block-receiving dents to prevent said locking block to fall thereinto; when the fixing knuckle is to be fixed in another position again, the inner disk member is made to rotate, therefore the locking block will encounter the front edge of one of said tooth first, stopping the board moving forward, and eventually fall into the dent so to lock the fixing knuckle in a new position. The disadvantage with this kind of structure lies in the pointed teeth which are either dangerous to people or vulnerable to bending due to accidental impacts, causing malfunction. The second type shown in FIG. 9A makes use of a radial claw board having a number of claw-like members disposed thereon and confinedly moving in corresponding arcuate slots to effect the same operation of locking and unlocking the fixing knuckle. The Structure of the second type mechanism eliminates the dangerous pointed teeth, used in the first type as shown in FIG. 9B, but the exposure of those arcuate slots to the environment can easily lead to malfunction as a result of incidental entry of foreign materials into there, and moreover, the radial claw board housed in the interior of the inner disk member which is made up of two symmetrical half shells of steel, riveted together, is not firmly fixed at position, only with the claw-like members confining in said arcuate slots, can easily lose its balance, so an extra fixing board for preventing said locking block from being out of place is required and it causes inconvenience in assembly.

In view of proceeding disadvantages associated with conventional fixing knuckles of aluminum folding ladders, the inventor is devoted to providing an improved fixing knuckle which is characterized by a locking assembly having a locking block pivotably mounted to a frame consisting of a pair of parallel L-shaped cam plates integrally connected together at their top ends whereto a pull spring is attached so to enable said cam plates to pivotably move back and forth about the pivot joining said locking block and cam plates together, and the bottom end of said cam plate is bended in a right-angled manner and each said cam plate is disposed in the place between the inner wall of said outer casing and the outer wall of said inner disk member respectively so that said frame consisting of a pair of said L-shaped cam plates is astride mounted on the inner disk member.

The improved fixing knuckle is further characterized by a number of projecting guide pins disposed on both sides of said inner disk member which can work in cooperation with said L-shaped cam plates to replace the radial claw board or fan-like toothed board adopted in conventional fixing knuckles, and all the movable and protruding parts which are dangerous to people and vulnerable to malfunction. The fixing knuckle according to the present invention can effect similar operational function as the prior art and, above all, eliminate the whole disadvantages associated with conventional fixing knuckles, such as lack of safety, vulnerability to malfunction and inconvenience in assembly, and this illuminates the major object of the present invention.

The other object of the present invention is to provide a fixing knuckle for an aluminum folding ladder, which is much safer to use by way of marking the bottom of said L-shaped cam plates with red color which can be clearly seen by user through said rectangular opening on the outer casing to warn the user that the fixing knuckle is in an unlocking state, so to avoid accidents resulting from improper use of the fixing knuckle of the present invention.

The further object of the present invention is to provide a fixing knuckle for an aluminum folding ladder which uses no rotary or projecting toothed parts so that it is not vulnerable to malfunction and safe to people around it and accordingly meet the safety requirement of the U. S. national inspection standards on aluminum ladder.

The present invention is better described by means of the accompanying drawing in which:

DESCRIPTION OF DRAWINGS

FIG. 9A is a reference view of a conventional mechanism of a fixing knuckle adopting a radial claw board.

FIG. 9B is a reference view of a conventional mechanism of another type using a fan-shaped peripherally toothed board.

FIG. 1 is an exploded view of the present fixing knuckle.

FIG. 2 is an exploded view of the locking assembly used in the present disclosure.

FIG. 3 is an assembling view of the present fixing knuckle.

FIG. 4 is the first operational illustration of the present fixing knuckle.

DETAILED DESCRIPTION

Figure 5:
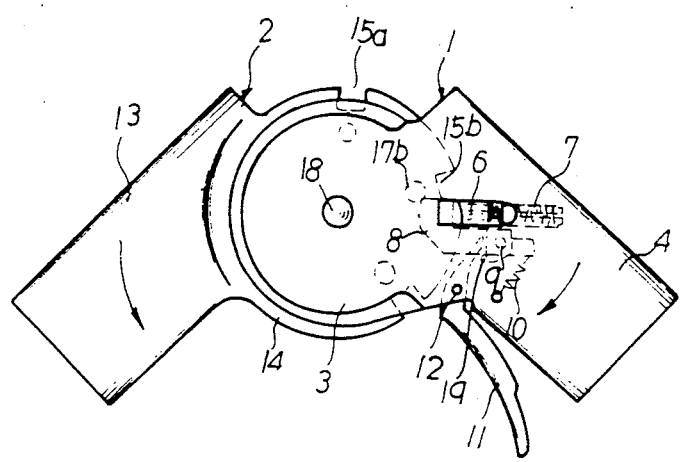
FIG. 5 is the second operational illustration of the present fixing knuckle.

Referring to FIG. 1, the fixing knuckle of the present invention is comprised of an outer casing 1 and an inner casing structure consisting of a inner disk member 14 and a tubular portion 13, and, the outer casing is closely similar to the one used in the prior art, made of sheet steel and formed into shape through punching process, and consisting of a round portion 3 and an extended hollow tubular portion 4 having a rectangular cross section, and a rectangular opening 5 disposed thereon (all the above structure is identical with those of the prior art), with a locking block 6 of the locking assembly T moveably located therein (the structure of the locking assembly T is shown in FIG. 2), and a connecting head 19 is integrally attached to the rear side of the locking block 6 at its top edge, on the bottom of which the front end of an unlocking trigger means 11 can actuate to prop up the locking assembly upwardly thereby to disengage the locking block 6 from one of the fixing dents 15a, 15b, 15c, allowing the disk member to rotate relatively within the outer casing for selectively shifting the knuckle to a new position. The connecting head 19 is pivotably disposed by a pin 9 between the two parallel L-shaped cam plates 8 joined together on their top ends whereto is attached a pull spring 10. The locking assembly is disposed in the outer casing 1 with the joined L-shaped cam plates 8 riding astride of the hollow inner disk member 14, in other words, each one of the L-shaped cam plates 8 is respectively inserted between the inner wall of the outer casing 1 and the outer wall of the hollow inner disk member 14, and the rectangular locking block 6 rests on the place where the L-shaped plates make a right-angled bend, when it disengages from the block-receiving dent. The L-shaped cam plates 8, are pin-connected with the connecting head 19 which is integrally joined to locking block 6 which is restrainedly moveable along the rectangular opening 5, in such a manner permitting said cam plates to both swingly rotate about said pin 9 and at the same time move upward or downward along with the locking block 6 which is limited to slide in the rectangular opening 5 so to enable the locking assembly to smoothly operate in the locking and unlocking process. The unlocking trigger means 11 is pivotably mounted by a pin 12 to the outer casing with its front end located just right under and in abutment against the bottom of said connecting head 19 and inside the tubular portion 4, and with the trigger arm kept outside thereof for triggering operation purpose. The inner casing structure 2 is manufactured in a conventional manner by folding two symmetrically shaped halves of sheet steel together through a punching process, forming a hollow tubular portion 13 having a rectangular cross section, and a hollow inner disk member 14 which has a number of equally spaced block-receiving dents 15a, 15b, 15c disposed along the periphery thereof for the effect of changing the fixing angle of the knuckle at a number of different stages, depending on the number of dents thereon, and the rest of the periphery of said disk member 2 is smoothly structured in a closed state without any other recessed spots on there except those said dents 15, so that the locking block 6 can precisely and smoothly slide thereon; and on both sides of said inner disk member 14 and right under the bottom of each said block-receiving dents there are correspondingly disposed a number of projecting guide pins 17a, 17b, 17c respectively which work in cooperation with said cam plates to achieve a precise control of locking and unlocking operations as desired. The inner casing structure 2 and the outer casing 1 are relatively rotatably joined together, and each of said guide pins 17a, 17b, 17c is located between its corresponding block-receiving dent and the central pivot hole 16 as viewed in the respective radial direction.

Figure 6:
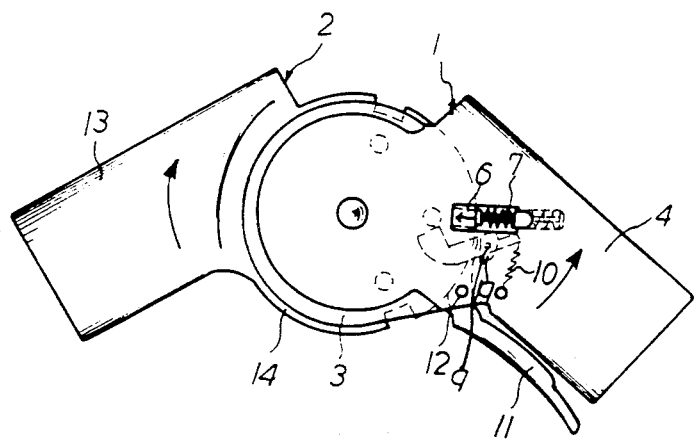
FIG. 6 is the third operational illustration of the present fixing knuckle.
Figure 7:
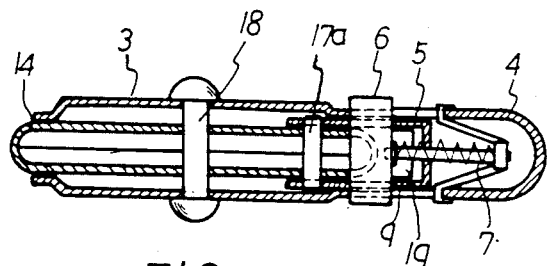
FIG. 7 is a sectional view of the present fixing knuckle, taken on line I—I in FIG. 3.
Figure 8:
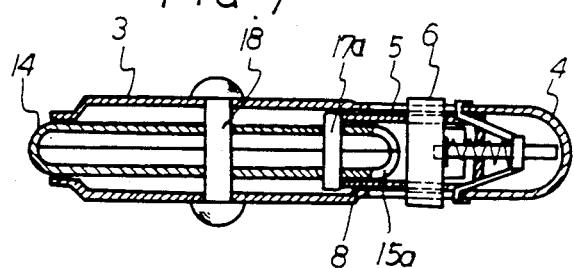
FIG. 8 is a sectional view of the present fixing knuckle, taken on line II—II in FIG. 4.

Continuing now to refer to FIG. 3 and FIG. 7, the outer casing 1 and inner casing structure 2 are rotatably assembled together by a pivot pin 18 with the inner disk member 14 housed in the interior of said outer casing 1. When the tubular portions 4 and 13 are moved to a collinear position as shown in the FIG. 3, the locking block 6 will fall into the block-receiving dent 15a, and in the meantime the front edges of the cam plates 8 on both sides of the inner disk member 14 are stopped by said projecting guide pins 17a, making the cam plates 8 swing away from the locking block by a small angle about said pin 9, and the trigger arm of the unlocking trigger means 11 is forced to stick to the underside of the hollow tubular portion 4 as a result of a levering effect. When the front end of the trigger means is pushed downward lifting the connecting head 19 of the locking assembly, in such way, the continuous counterclockwise rotation of the inner disk member 14 can make the cam plate 8 disengage from said guide pin 17a and move toward the guide pin 17b as shown in FIG. 4 and FIG. 5. As a result, the arcuate bottom side of the cam plate 8 comes into contact with said guide pin 17b first, and climbs up the guide pin 17b to the summit point thereof, carrying the locking block 6 which dwells on the chair-like bend and slides along the periphery of said inner disk member 14 over the block-receiving dent, due to the distance X away from the mouth of the dent 15b, the continuous rotation of the inner disk member 14 makes the bottom side of said cam plate 8 to go down from the summit point and move to the other side of the guide pin as shown in FIG. 5. After the locking block is carried over to the other side of said block-receiving dent 15b, and the front edge of the cam plate 8 leans against the guide pin 17b, the inner disk member 14 can be clockwisely rotated at this moment as shown in FIG. 6 by pushing the tubular portion 13 in the arrow-indicated direction which is reverse from that direction indicated in FIG. 5. The rectangular locking block 6 sitting on the bend places of said two parallel cam plates 8 which astride mounts on said inner disk member, and sliding along the periphery thereof, begins to approach said dent 15b and traps therein eventually with the pushing assistance of said spring 7, and in the meantime, the cam plate 8 is stopped as shown in FIG. 6 to move along with said locking block 6 because the front edge of said cam plate 8 leans against the guide pin 17b; with the continuous rotation of the inner disk member, the periphery of guide pin 17b continues to act on the front edge of said cam plates 8 and put the cam plate 8 in such a position as shown in FIG. 6 due to the assistance of said spring 10. This ends up the whole procedures of adjusting the fixing angle, and brings the fixing knuckle into a new position as wished.

It becomes apparent from the proceeding descriptions that once the unlocking trigger means 11 is actuated, the rectangular locking block 6 is propped up to disengage from said block-receiving dent 15 and in the meanwhile the L-shaped cam plate 8 is brought to a position between said locking block 6 and said projecting guide pin 17, and on the right-angled bending place of said cam plate 8 dwells the locking block, in such a way, the locking block 6 is prevented to fall into said dent again and stay thereout, unless the front edge of said cam plate 8 is stopped by one of the projecting guide pins 17 again due to the clockwise rotation of said inner disk member 14, the locking block will then fall again into one of said blocking-receiving dents 15.

It is clearly seen that the locking assembly T, including a frame consisting of two parallel L-shaped cam plates 8 and the locking block 6 which is integrally joined as one with said connecting head 19 which is then pivotably coupled to said cam plates 8, can work in cooperation with said projecting guide pins on both sides of said inner disk member 14 as well as said unlocking trigger means 11 to effect the operation of locking and unlocking precisely and steadily the fixing knuckle.

The improved fixing knuckle for a aluminum folding ladder is so rigidly structured that it can be safely, readily and precisely operated without vulnerability to malfunction, and duely meets the inspection criterion of U.S. national aluminum ladder safety satandard.

What I claim is:

1. A structural improvement of the locking and unlocking mechanism for a fixing knuckle of an aluminum folding ladder, comprising;
   a rectangular locking block mounted with a first pivot pin on a frame consisting of a pair of parallel L-shaped plates integrally joined together at their top ends, a pull spring attached to said top ends said L-shaped cam plates being disposed in an outer casing and mounted astride on an inner disk member which is also housed in said outer casing, each said L-shaped cam plate being structured to have a right-angled bend at its bottom end on which a bottom side of said rectangular locking block can dwell at times in the process of operation, the bottom side of each said cam plate being arcuately and smoothly contoured so that said cam plates can work smoothly in cooperation with a projecting guide pin on said inner disk member to repeatedly effect a downward and swinging motion about the first pivot pin joining said cam plates and said lock block together, as the front edge of said cam plate is pushed by external force.

2. An improved locking and unlocking mechanism of the fixing knuckle for an aluminum folding ladder as claimed in claim 1, which is characterized in that, a number of projecting guide pins are disposed on both sides of said inner disk member and radially located between each of a plurality of block-receiving dents and a second pivot pin joining said outer casing and said inner disk member, together respectively in each corresponding radial direction to work in cooperation with said L-shaped cam plates to effect the operation of locking and unlocking said fixed knuckle.

3. An improved locking and unlocking mechanism of the fixing knuckle for an aluminum folding ladder as claimed in claim 2, which is characterized by its said L-shaped plate pivotably joined with said locking block, and having a front edge at the right-angled bend which is at times in contact with said projecting guide pin and has a width larger than the radial distance from a corresponding summit point of said projecting guide pin to the corresponding periphery point in the radial direction of said related block-receiving dent so that the bottom side of said locking block is kept at a small distance away from the periphery of said inner disk member when said locking block is engaged on said right-angled bend of said L-shaped cam plates.

4. An improved locking mechanism for use with the fixing knuckle of an aluminum folding ladder comprising:
   an outer casing;
   an inner disk member pivotally housed within said outer casing;
   said inner disk member comprising at least one wall member, a plurality of dents on the peripheral edge of said wall member, and a plurality of guide pins, each guide pin being adjacent to the bottom of a corresponding one of said dents, said guide pins projecting laterally beyond both sides of said wall;
   locking block means, spring-biased and slideably mounted on said outer casing, for selectively engaging said dents; and
   spring-biased retaining and release means, pivotally mounted on said locking block means, for retaining said locking block means when disengaged from said dents and during rotation of said outer casing in relation to said inner disk member in one direction and thereafter for selectively releasing said locking block means into another said dent by engagement of said retaining and release means with a selected guide pin when rotating said outer casing in relation to said inner disk member in an opposite direction.

5. The improved locking mechanism as claimed in claim 4, wherein said spring-biased retaining and release means comprises:
   a frame consisting of a pair of parallel L-shaped cam plates integrally joined together at their top ends, a pull spring attached to said top end and said outer casing, said L-shaped cam plates being disposed in said outer casing and mounted astride said inner disk member, each said cam plate having a right-angled bend at its bottom end on which a bottom side of said locking block means can be engaged when a lever lifts said locking block means out of engagement with said dents, the bottom side of each cam plate being arcuately and smoothly contoured so that said cam plates can work smoothly in cooperation with said projecting guide pins to effect a downward and swinging motion about a pivot pin joining said cam plates and said locking block means together, as the front edge of said cam plate is pushed by the rotation of said outer casing in relation to said inner disk member.

* * * * *